United States Patent [19]

Akkapeddi et al.

[11] Patent Number: 5,541,267

[45] Date of Patent: Jul. 30, 1996

[54] POLYAMIDE COMPOSITIONS COMPRISING ALIPHATIC POLYAMIDE AND AN AROMATIC POLYAMIDE OLIGOMER HAVING IMPROVED MOISTURE RESISTANCE

[75] Inventors: Murali K. Akkapeddi; Jeffrey H. Glans, both of Morristown; Gerald J. Dege, Flanders; Sengshiu J. Chung, Parsippany, both of N.J.

[73] Assignee: AlliedSignal Inc., Morris Township, N.J.

[21] Appl. No.: 345,269

[22] Filed: Nov. 28, 1994

Related U.S. Application Data

[63] Continuation of Ser. No. 155,968, Nov. 19, 1993, abandoned.

[51] Int. Cl.$^6$ ................................................ C08L 77/00
[52] U.S. Cl. ................ 525/432; 525/66; 525/183; 525/424; 524/504; 524/538
[58] Field of Search .................................... 525/432, 424

[56] References Cited

U.S. PATENT DOCUMENTS

| | | |
|---|---|---|
| 4,014,957 | 3/1977 | Kirsch et al. . |
| 4,278,779 | 7/1981 | Nakagawa et al. ............ 525/432 |
| 4,467,011 | 8/1984 | Brooks et al. . |
| 4,565,850 | 1/1986 | Prevorsek et al. . |
| 4,788,248 | 11/1988 | Maresca et al. . |
| 4,788,249 | 11/1988 | Maresca et al. . |
| 4,952,628 | 8/1990 | Blatz . |
| 4,983,719 | 1/1991 | Fox et al. . |

FOREIGN PATENT DOCUMENTS

| | | |
|---|---|---|
| 0007631 | 2/1980 | European Pat. Off. . |
| 0320234 | 6/1989 | European Pat. Off. . |
| 0488335 | 6/1992 | European Pat. Off. . |
| 2344334 | 3/1975 | Germany ................ 525/432 |
| 2241959 | 10/1987 | Japan ..................... 525/432 |
| 3223059 | 9/1988 | Japan ..................... 525/432 |
| WO91/13113 | 9/1991 | WIPO . |

OTHER PUBLICATIONS

Patent Abstracts of Japan vol. 004, No. 061 (C–009 8 May 1980 & JP 55 029 516 (Teijin Ltd) 1 March 1980.

The Effect of Structure Upon The Oxygen Permeation Properties of Amorphous Polyamides, T. D. Krizan, J. C. Coburn and P. S. Blatz pp. 9–10.

Miscibility in Blends of Aliphatic polyamides and an Aromatic Polyamide, Nylon 3ME6T, T. S. Ellis, Polymer, 1988 vol. 29, Nov., pp. 2015–2026.

Preparation of Properties of Aromatic Copolyamides From Aromatic Diisocyanates and Aromatic Dicarboxylic Acids, Journal of Polymer Science: Part A: Polymer Chemistry, vol. 27, 1775–1780 (1989).

Primary Examiner—Ana L. Carrillo
Attorney, Agent, or Firm—Melanie L. Brown; Roger H. Criss

[57] ABSTRACT

A polyamide composition comprising an aliphatic polyamide such as nylon 6 and an oligomeric aromatic polyamide, such as oligomers of poly(tolylene diisophthalamide), which exhibit improved retention flexural modulus and flexural strength at ambient humidity, i.e. about 50% to about 65%.

14 Claims, 4 Drawing Sheets

POLYAMIDE COMPOSITIONS COMPRISING ALIPHATIC POLYAMIDE AND AN AROMATIC POLYAMIDE OLIGOMER HAVING IMPROVED MOISTURE RESISTANCE

This application is a continuation of application Ser. No. 08/155,968 filed Nov. 19, 1993, now abandoned.

BACKGROUND OF THE INVENTION

The present invention relates to blends of aliphatic nylons such as nylon 6 and certain oligomeric aromatic polyamides which exhibit improved retention of flexural modulus and flexural strength at high relative humidity (i.e. equal to or greater than about 25%). Another aspect of this invention relates to articles of manufacture formed from the blend of this invention and to a process for forming the oligomeric aromatic polyamide.

Aromatic polyamides and blends thereof are known. See for example U.S. Pat. Nos. 4,014,957; 4,467,011; 4,788,248; 4,788,249 and 4,983,719.

SUMMARY OF THE INVENTION

One aspect of this invention is directed to a polyamide composition comprising:
(a) an "aliphatic polyamide"; and
(b) an "oligomeric aromatic polyamide" having recurring monomeric units of the formulas:

Formula A:

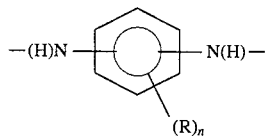

and Formula B: —CO—Ar—CO—
wherein:
n is 0, 1, 2, 3, or 4;
R is the same or different at each occurrence and is alkyl, alkoxy, halo, aryl, aryloxy; and
Ar is an arylene moiety which may be 1,3- (or 1,4-) phenylene; substituted 1,3- (or 1,4-) phenylene; 2,6-naphthylene; substituted naphthylene; and the like.

Another aspect of this invention relates to articles such as films, fibers, molded parts and the like, comprising a body which is formed totally or in part from the composition of this invention.

The composition of this invention and articles formed therefrom exhibit several advantages as compared to compositions and articles formed from aliphatic polyamides such as nylon 6, which do not include the oligomeric aromatic polyamide. For example, typically, nylon 6 is sensitive to moisture and exhibits significant reductions in flexural strength and flexural modulus at relatively high humidities, i.e. equal to or greater than about 25% relative humidity. However, the polyamide composition of this invention is relatively insensitive to humidity and exhibits much lower reductions in tensile and flexural strengths and modulus at relatively high humidities than the aliphatic polyamide such as nylon 6 along. Another advantage of the compositions of this invention is the enhanced glass transition temperature at low and high relative humidities. Yet another advantage of the compositions of this invention is the reduced dimensional growth at high relative humidites such as at 56% RH.

Another aspect of this invention is directed to a polyamide composition comprising (a) an "aliphatic polyamide", (b) an "oligomeric aromatic polyamide" as described above, and optionally (c) a functionalized olefinic polymer. The functionalized olefinic polymer is either a carboxyl or anhydride functionalized polypropylene, polyethylene, or ethylene propylene copolymer. The purpose of the functionalized olefinic polymer additive is to further reduce the moisture absorption and the dimensional growth of the composition.

Another aspect of this invention comprises a process for preparing an oligomeric aromatic polyamide which comprises reacting an aromatic isocyanate of the formula:

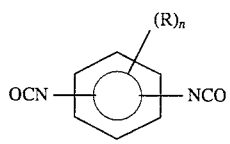

with an aromatic dicarboxylic acid of the formula:

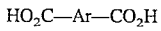

in a lactam or amide solvent such as caprolactam or N-methylpyrrolidone in the presence of a base such as an alkali metal or alkaline earth metal hydroxide or alkoxide wherein n, R, and Ar are as defined above.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE PREFERRED EMBODIMENTS

Figure 1:
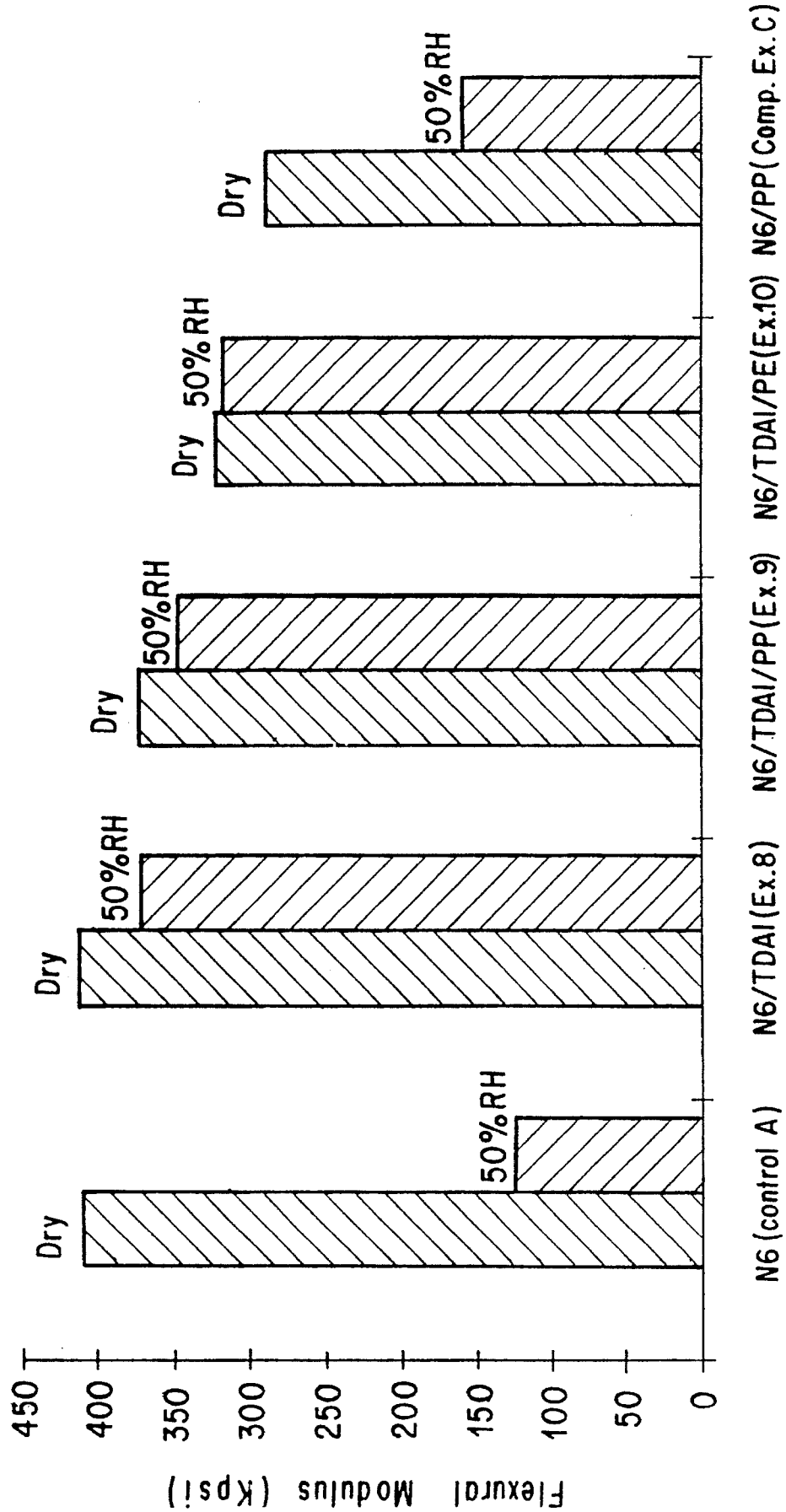
FIG. 1 is a graph of flexural modulus as a function of moisture content vs. composition showing the affect of moisture content on flexural modulus.

The composition of this invention comprises two essential ingredients. One essential ingredient is an "aliphatic polyamide". As used herein, an "aliphatic polyamide" is a polyamide characterized by the presence of recurring carbonamide groups as an integral part of the polymer chain which are separated from one another by at least two aliphatic carbon atoms. Illustrative of these polyamides are those having recurring monomeric units represented by the general formula:

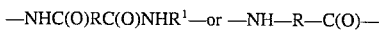

or a combination thereof in which R and $R^1$ are the same or different and are alkylene groups of at least about two carbon atoms, preferably alkylene having from about 2 to about 12 carbon atoms. Exemplary of such polyamides are polyamides formed by the reaction of diamines and diacids such as poly(tetramethylene adipamide)(nylon 4,6); poly(hexamethylene adipamide) (nylon 6,6); poly(hexamethylene azelamide) (nylon 6,9); poly(hexamethylene sebacamide)(nylon 6,10); poly(heptamethylene pimelamide) (nylon 7,7); poly-(octamethylene suberamide) (nylon 8,8); poly(nonamethylene azelamide) (nylon 9,9); poly(decamethylene azelamide) (nylon 10,9); and the like. Also illustrative of useful aliphatic polyamides are those formed by polymerization of amino acids and derivatives thereof, as for example lactams. Illustrative of these useful polyamides are poly(4-aminobutyric acid) (nylon 4); poly(6-aminohexanoic acid) (nylon 6); poly(7-aminoheptanoic acid) (nylon 7); poly(8-aminoocatanoic acid) (nylon 8); poly(9aminononanoic acid) (nylon 9); poly( 10-aminodecanoic acid) (nylon 10); poly(11-aminoundecanoic acid) (nylon 11 ); poly(12-aminododecanoic acid) (nylon 12); and the like. Blends of two or more aliphatic polyamides may also be employed.

Copolymers formed from any combination of the recurring units of the above referenced aliphatic polyamides can be used. By way of illustration and not limitation, such aliphatic polyamide copolymers include caprolactam/hexamethylene adipamide copolymer (nylon 6/6,6); hexamethylene adipamide/caprolactam copolymer (nylon 6, 6/6); hexamethylene adipamide/hexamethylene-azelamide copolymer (nylon 6,6/6,9); and copolymers formed from recurring units of the above referenced aliphatic polyamides with aliphatic/aromatic polyamide recurring units may also be used. Examples of such copolyamides are nylon 6/6T; nylon 6,6/6,T; nylon 6/10T; nylon 6/12T; nylon 6,10/6,T etc.

Preferred aliphatic polyamides for use in the practice of this invention are poly(caprolactam); poly(7-aminoheptanoic acid); poly(tetramethylene adipamide); poly(hexamethylene adipamide); and mixtures thereof. The particularly preferred aliphatic polyamides are poly(caprolactam); poly-(hexamethylene adipamide); poly(tetramethylene adipamide); and mixtures thereof.

Aliphatic polyamides useful in the practice of this invention may be obtained from commercial sources or prepared in accordance with known preparatory techniques. For example, polycaprolactam may be obtained from AlliedSignal Inc. and poly(hexamethylene adipamide) may be obtained from DuPont Co.

The number average molecular weight of the aliphatic polyamide may vary widely. Usually, the aliphatic polyamide is of film forming molecular weight that is sufficiently high to form a free standing film and sufficiently low to allow melt processing of the blend into a film. Such number average molecular weights are well known to those of skill in the film forming art and are usually at least about 5,000 as determined by the formic acid viscosity method. In this method, a solution of 9.2 wt. concentration of aliphatic polyamide in 90% formic acid at 25° C. is used. In the preferred embodiments of the invention, the number average molecular weight of the aliphatic polyamide is from about 5,000 to about 1,000,000 and in the particularly preferred embodiments is from about 10,000 to about 100,000. Amongst the particularly preferred embodiments, most preferred are those in which the molecular weight of the aliphatic polyamide is from about 20,000 to about 40,000.

The amount of aliphatic polyamide included in the composition may vary widely. In the preferred embodiments of the invention, the amount of aliphatic polyamide employed is equal to or greater than about 70 weight percent based on the total weight of the oligomeric aromatic polyamide and aliphatic polyamide in the blend, and in the particularly preferred embodiments of this invention is from about 75 to about 99 weight percent on the aforementioned basis. Amongst these particularly preferred embodiments, most preferred are those embodiments where the amount of aliphatic polyamide employed is from about 85 to about 95 weight percent based on the total weight of aliphatic polyamide and oligomeric aromatic polyamide.

As a second primary ingredient, the composition of this invention includes an "oligomeric aromatic polyamide." As used herein, an "oligomeric aromatic polyamide" is an aromatic polyamide having recurring monomeric units of the formulas:

Formula A:

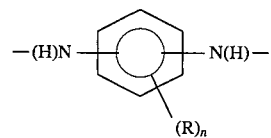

and Formula B: —OC—Ar—CO—
wherein:

n is 1, 2, 3, or 4;

R is the same or different at each occurrence and is alkyl, alkoxy, halo, aryl, aryloxy; and Ar is an arylene which may be 1,3- (or 1,4-) phenylene; substituted 1,3- (or 1,4-) phenylene; 2,6-naphthylene; substituted naphthylene; and the like. Preferably R is alkyl, more preferably methyl, ethyl, or butyl, and most preferably methyl.

Illustrative of useful oligomeric polyamides are poly-(tolylene-2,4-(2,6-)isophthalamide); poly(tolylene-2,4(2,6)-terephthalamide); poly(tolylene-2,4(2,6)-tere/isophthalamide); poly(tolylene-2,4(2,6)-2,6-naphthalamide); poly(methylene-bis-4,4'-diphenylene/tolylene; 2,4(2, 6)isophthalamide; poly(methylene-bis-4,4'-diphenylene/ tolylene; poly(4,4' -biphenylene isophthalamide); poly-(tolylene-2,4(2,6)-naphthalamide); and poly(tolylene- 2,6-isophthalamide).

Preferred oligomeric aromatic polyamides are poly-(tolylene-2,4-(2,6)-isophthalamide); poly(tolylene-2,6-isophthalamide); poly(tolylene-2,4(2,6)-tere/isophthalamide); poly(methylene-bis-4,4'-diphenylene/tolylene-2,4(2, 6)-isophthalamide); and mixtures thereof. More preferred oligomeric aromatic polyamides are poly(tolylene-2,4 -(2,6) isophthalamide); poly(tolylene-2,6-isophthalamide); poly-(methylene-bis-4,4'-diphenylene/tolylene-2,4(2,6-isophthalamide); and mixtures thereof. The most preferred oligomeric aromatic polyamides are poly(tolylene-2,4(2,6)-isophthalamide); poly(tolylene-2,6-isophthalamide); and mixtures thereof.

The mole ratio of recurring monomeric units of Formula A to recurring monomeric units of Formula B is about 1:1.

In addition to the essential recurring monomeric units of the Formula A or B, the oligomeric aromatic polyamide of this invention may optionally include up to 10 mole percent of aliphatic monomeric units of the formulas —N(H)—R₁—N(H)—, and

—(O)C—R$_2$—C(O)— combination thereof, where the total number of moieties of the formula —N(H)— and —C(O)— in the oligomeric aromatic polyamide are equal and, where R$_1$ and R$_2$ are the same or different and are aliphatic moieties such as ethylene, propylene, butylene, hexamethylene, nonemethylene, decemethylene, dodecamethylene etc. The aliphatic monomeric units may also consist of the formula —NH—R$_3$—CO— where R$_3$ is ethylene, butylene, pentamethylene, hexamethylene, undecamethylene, decamethylene, and the like.

The intrinsic viscosity of the oligomeric aromatic polyamide is critical and is a result of the oligomeric character of the oligomeric aromatic polyamide. The oligomeric aromatic polyamide usually has an intrinsic viscosity equal to or less than about 1.0 dl/g. The oligomeric aromatic polyamide preferably has an intrinsic viscosity of less than about 0.8 dl/g; more preferably from about 0.1 to about 0.7 dl/g; and most preferably from about 0.15 to about 0.5 dl/g. These viscosity values are determined with the use of a standard Ubbehlohde viscometer in N,N'-dimethylacetamide in a concentration of 0.5% at room temperature (about 25° C.). The molecular weights of the oligomers typically ranged from about 1,000 to about 5,000 and more typically between about 2,000 to about 4,000 as determined by gel permeation chromatography (GPC).

The glass transition temperature (Tg) of the oligomeric aromatic polyamide may vary widely and is usually greater than that of the aliphatic polyamide and less than 300° C. The glass transition temperature of the oligomeric aromatic polyamide is preferably equal to or greater than about 180° C., more preferably from about 180° to about 300° C. and most preferably from about 200° to about 280° C. The glass transition temperature (Tg) can be determined by differential scanning calorimetry.

The amount of oligomeric aromatic polyamide included in the composition may vary widely and any amount which enhances the properties of the aliphatic polyamide, i.e. Tg and moisture resistance, may be used. Usually, the amount of oligomeric aromatic polyamide is at least about 1% by weight of the oligomeric polyamide and aliphatic polyamide in the composition. The amount of oligomeric aromatic polyamide is preferably from about 1 to about 30% by weight, more preferably from about 5 to about 25% by weight, and most preferably from about 5 to about 15% by weight based on the total weight of oligomeric polyamide and aliphatic aromatic polyamide in the composition.

The aromatic oligomeric polyamide used in this invention may be prepared using conventional procedures as for example the procedures described in *Encyclopedia of Polymer Science and Technology*, published by John Wiley & Sons, Inc. Vol. 10, pp. 487–491 (1969). The aromatic oligomers polyamide are preferably prepared in accordance with the process of this invention which comprises reacting a diisocyanate of the formula:

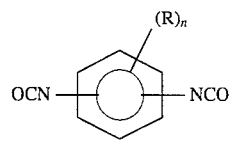

with a dicarboxylic acid of the formula:

HO$_2$C—Ar—CO$_2$H in a lactam or amide solvent in the presence of a base. The optional recurring monomeric units may be introduced into the oligomeric aromatic polyamide merely by addition of the appropriate diisocyanate of the formula OCN—R$_1$—NCO or dicarboxylic acid of the formula OCN—R$_1$—NCO to the reaction mixture in the desired amount.

Useful diisocyanates include 2,4-tolylene diisocyanate (TDI); technical grade tolylene diisocyanate (which is a mixture of 2,4-tolylene diisocyanate and 2,6-tolylene diisocyanate); 4,4'-methylene di(phenylisocyanate)(MDI); mixture of 2,4-tolylene diisocyanate (TDI) and 4,4'-methylene di(phenylisocyanate) (MDI); tolylene-2,6-isophthalamide (TDAI); 4,4'-methylene-di(o-tolyl)isocyanate; 4,4'-biphenylene diisocyanate etc. Of these, 2,4-tolylene diisocyanate; technical grade tolylene diisocyanate; and 4,4'-methylene-di-(o-tolyl isocyanate) are more preferred. The most preferred diisocyanates include 2,4-tolylene diisocyanate and technical grade tolylene diisocyanate.

Useful dicarboxylic acids include isophthalic acid; terephthalic acid; 2,6-naphthalene dicarboxylic acid; and substituted isophthalic acids such as 5-methyl, 5-chloro, 5-hydroxy, or 5-nitro isophthalic acids. The more preferred dicarboxylic acids are isophthalic acid; terephthalic acid; and substituted isophthalic acids. Isophthalic acid and terephthalic acid are the most preferred.

Useful bases vary widely. Illustrative of useful bases are alkali and alkaline earth metal hydroxides or alkoxides such as sodium methoxide, sodium hydroxide, sodium ethoxide, potassium hydroxide, and the like. Preferred bases are alkali metal hydroxides and alkoxides, especially hydroxides and alkoxides of sodium. More preferred bases are sodium alkoxides and most preferred bases are sodium methoxide and sodium ethoxide.

Reaction temperatures may vary widely. Preferred reaction temperatures are from about 150° to about 280° C., more preferred reaction temperatures are from about 160° to about 250° C., and most preferred reaction temperatures are from about 180° to about 220° C.

Reaction pressures may vary widely. The reaction is preferably carried out under autogeneous pressure.

Reaction times vary widely. The reaction time is usually controlled by the rate of carbon dioxide evolution.

The reaction is carried out in a solvent which is non-reactive with the reactants under the reaction conditions. The reaction solvent is preferably a lactam or an amide solvent such as caprolactam; pyrrolidone; N-methyl pyrrolidone; N,N'-dimethyl acetamide; N,N'-dimethyl formamide etc. and most preferably is a lactam such as caprolactam, pyrrolidone or N-methyl pyrrolidone.

In addition to the above-described essential components, the composition of this invention may optionally include a functionalized, thermoplastic olefinic polymer. The functionalized olefinic polymer may consist of a conventional polyethylene (LDPE, HDPE), polypropylene, or ethylene/propylene copolymer modified by grafting, to contain about 0.1 to about 5 weight percent of a carboxyl or anhydride functionality. Such functionalized polyolefins are typically prepared by melt-phase or solution-phase grafting with maleic anhydride ("maleation"), fumaric acid, acrylic acid, or other similar unsaturated functional reagents. See for example U.S. Pat. Nos. 3,862,265 and 3,884,882 and J. Appl. Polym. Sci. 18, 967(1974). Examples of suitable functionalized olefinic polymers that are useful in the present invention are: maleated or carboxylated polyethylenes, maleated or carboxylated polypropylenes, maleated or carboxylated ethylene/propylene copolymers, and maleated or carboxylated poly(4-methyl-l-pentene). The amount of the functionalized olefinic polymer in the polyamide composition of this invention, may vary from 0 to about 50 weight percent based on the total weight of the aliphatic polyamide, oligomeric aromatic polyamide, and the functionized olefinic polymer.

Figure 2:
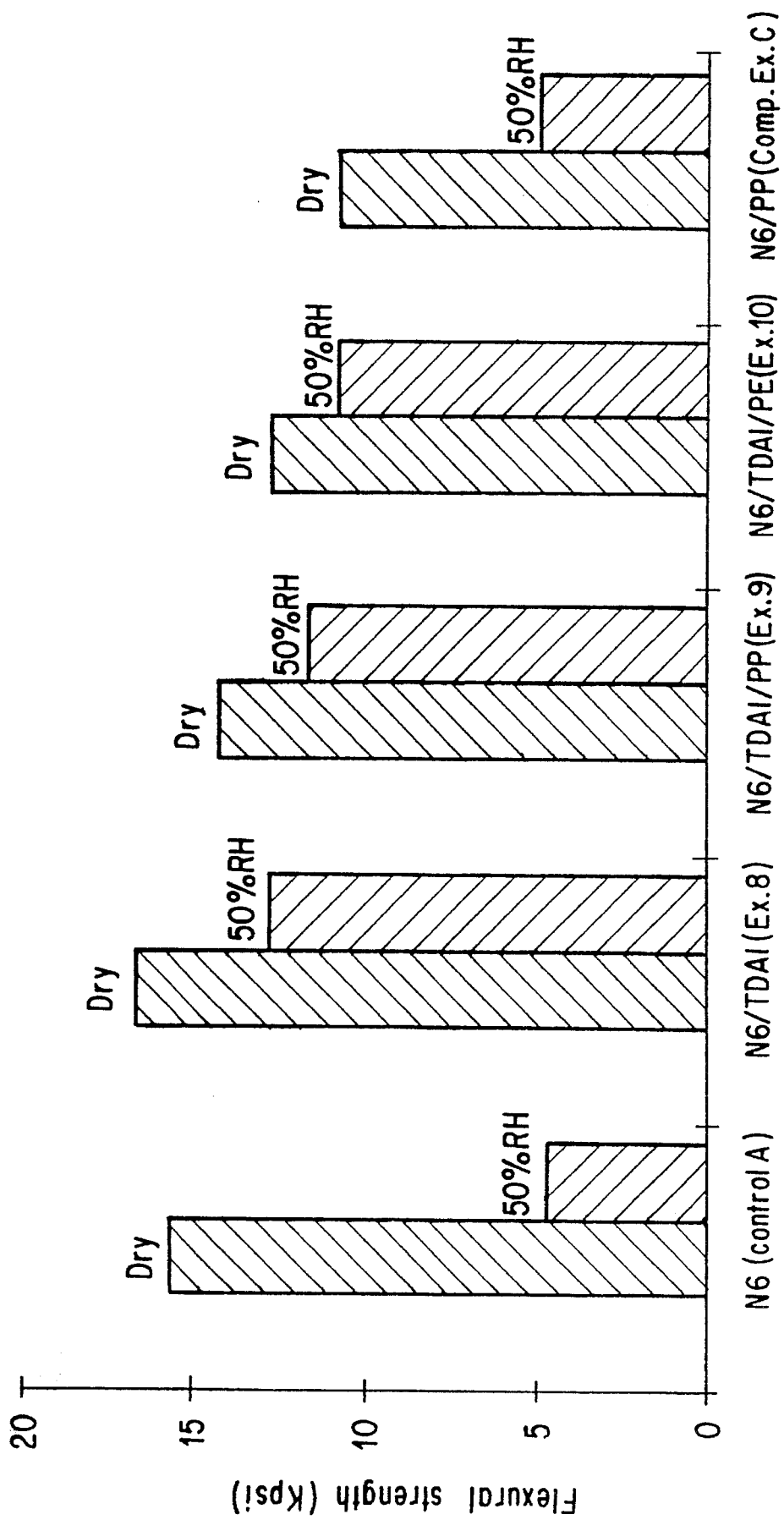
FIG. 2 is a graph of flexural strength as a function of moisture content vs. composition showing the affect of moisture content on flexural strength.
Figure 3:
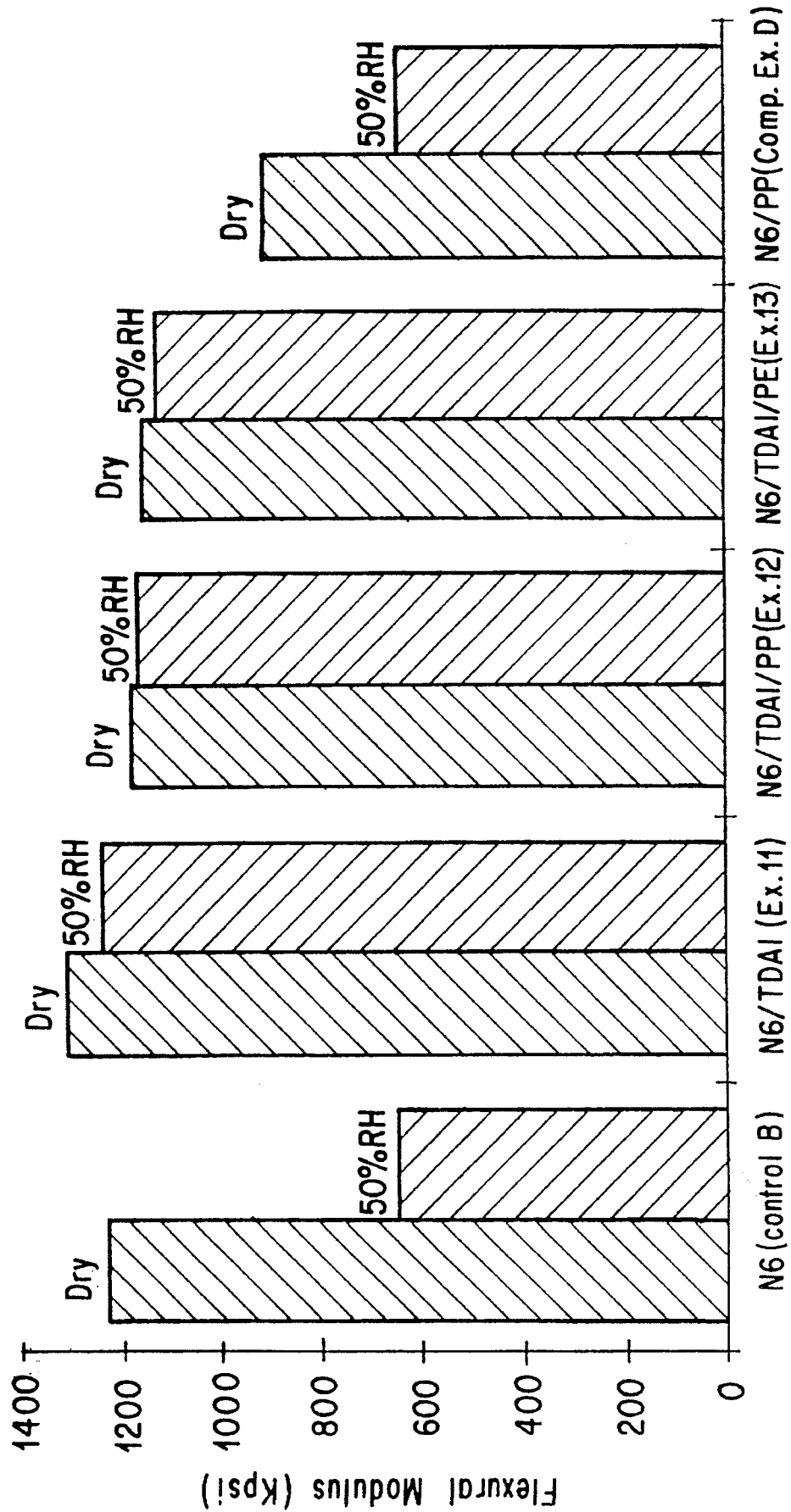
FIG. 3 is a graph of flexural modulus as a function of moisture content vs. filled composition showing the affect of moisture content on flexural modulus.
Figure 4:
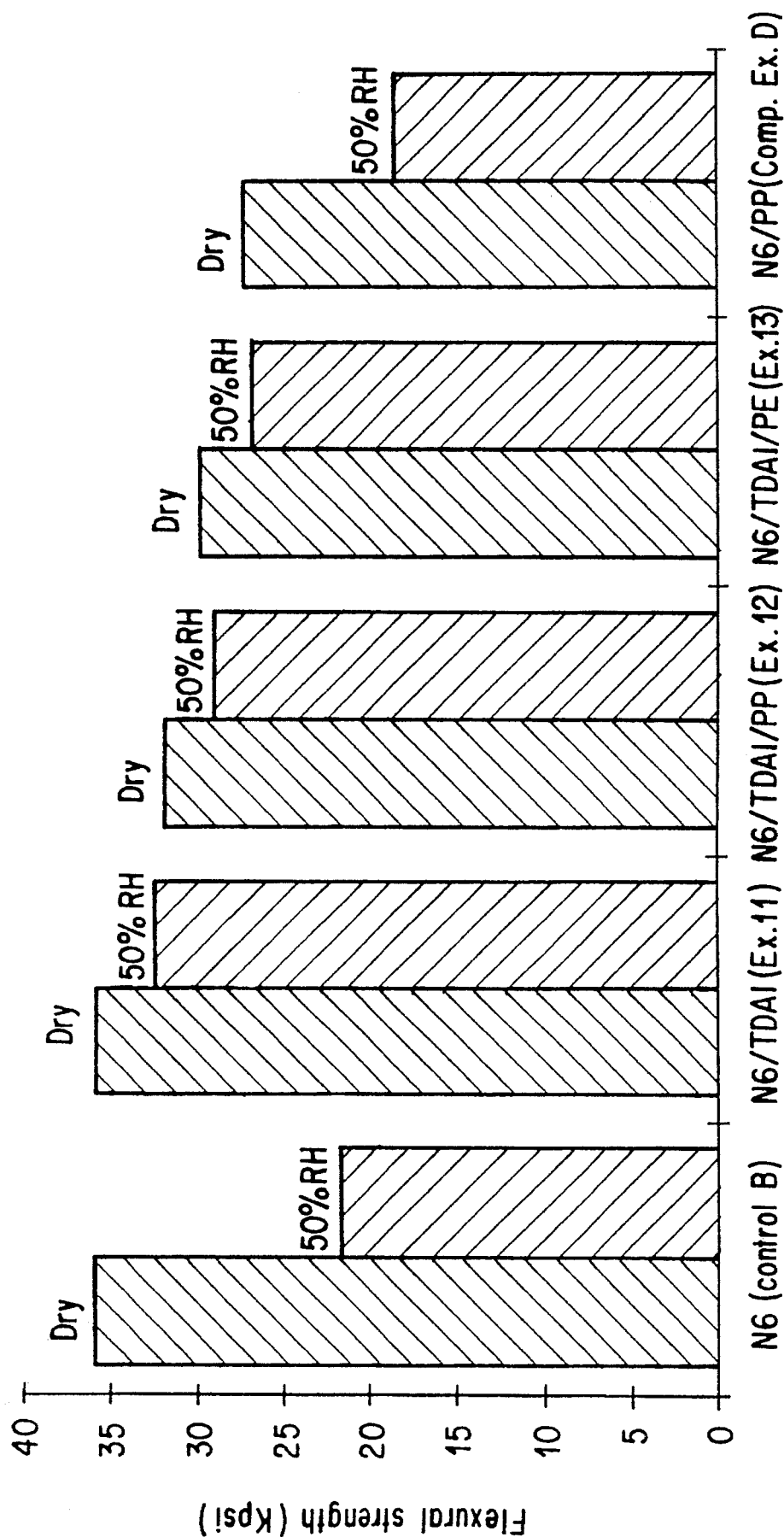
FIG. 4 is a graph of flexural strength as a function of moisture content vs. filled composition showing the effect of moisture content on flexural strength.

The purpose of including the functionalized olefinic polymer in the polyamide composition of the present invention, is to combine synergistically the advantages of low moisture absorption and dimensional growth, with humidity of the polyolefin, with the advantages of retaining high modulus and strength with humidity caused by adding the oligomeric aromatic polyamide in the aliphatic polyamide matrix. The advantage of improved modulus retention with humidity is illustrated in FIGS. 1,2,3 and 4, in which the compositions of Examples 9 and 12 below are compared with comparative examples C and D. Compositions of Examples 9 and 12 showed reduced moisture absorption and dimensional growth relative to Examples 8 and 11 below, in which the functionalized polyolefin is absent (see Table 2 below).

The compositions of this invention may also include optionally, a suitable impact modifier. Suitable impact modifiers include functionalized elastomers such as anhydride, carboxyl, amino or epoxy functionalized ethylene copolymers, ethylene/propylene (EP) or ethylene/propylene/diene (EPDM) rubbers, styrene-butadiene-styrene (SBS) block copolymers and their hydrogenated derivatives such as styrene-ethylene/butylene-styrene (S-EB-S) block copolymers rubbers. Such functionalized elastomers are commercially available, e.g., maleated EPR (Exxelor® VA-1803, Exxon Chem Co.) and maleated S-EB-S block copolymer rubber (Kraton® FG 1901x, Shell Chem. Co.).

Another class of impact modifiers suitable for use in the compositions of the present invention, includes core-shell type rubbers of small particle size (<1μ) consisting of a crosslinked polybutadiene, poly(styrene-co-butadiene), poly(n-butylacrylate), rubber core grafted with poly(methyl methacrylate), poly(styrene-co-methyl methacrylate), or poly(styrene-co-acrylonitrile) as the outer shell. Such core-shell rubbers are commercially available from such sources as Rohm and Haas Co. (Paraloid® series) and Takeda Chemical Co. (Staphyloid® Series) etc. These core-shell type rubbers may also be of a functionalized type such as the carboxyl functionalized core shell rubber (Paraloid® EXL-3386, Rohm and Haas).

The amount of the suitable impact modifier may vary from 0 to about 30 percent based on the total weight of the aliphatic polyamide, aromatic polyamide oligomer, and the impact modifier with or without the optional, functionalized olefinic polymer. Generally the impact modifier content is optimized, as obvious to those skilled in art, to achieve the desired balance of impact strength vs. modulus, strength, and heat resistance properties.

In addition to the above-described essential components, the composition of this invention may also include various other optional components which are additives commonly employed with polyamide resins. Such optional components include fillers such as talc, fiberglass, clay, and the like; plasticizers, such as lactams, polyesters and sulfonamides such as caprolactam, lauryllactam, ortho and para-toluene ethyl sulfonamides polyester glutamate, polyester glycol, polyester adipate and the like, chain extenders; colorants and pigments such as iron oxide, calcium red, rhodamine, chrome yellow, chrome green, phthalo-cyanine blue and the like; mold release agents; antioxidants; ultraviolet light stabilizers; nucleators; lubricants; antistatic agents; fire retardants; and the like. These optional components are well known to those of skill in the art, accordingly, they will not be described herein in detail. These optional materials may be incorporated into the composition using any conventional process. Typically, such optional materials are included in the mixing step for formation of the blend or is added in subsequent melt forming processes such as injection molding.

The composition of this invention exhibits improved properties as compared to the aliphatic polyamide component of the composition. For example, the composition of this invention exhibits increased glass transition temperature (Tg) as compared to the aliphatic polyamide component of the composition. As a result, the composition of this invention is superior to the aliphatic polyamide such as nylon 6. The glass transition temperature of the composition wherein the aliphatic polyamide is nylon 6 is usually at least about 55° C., preferably at least about 60° C., more preferably from about 5° C. to about 30° C., and most preferably from about 10° C. to about 20° C. higher than that of the aliphatic polyamide component.

The compositions of this invention also show significant better retention of flexural modulus (ASTM-D-790) and flexural strength (ASTM-D-790) than the aliphatic polyamide component alone or the binary mixture of aliphatic polyamide and functionalized polyolefin (comparative C and D) at ambient relative humidities of from about 50 to about 65%. The percent retention of flexural modulus and flexural strength is usually greater than 35%, preferably equal to or greater than about 50%, more preferably equal to or greater than about 60%, and most preferably from about 65 to about 95%.

The composition of this invention may be prepared by blending or mixing the essential ingredients, and other optional components, as uniformly as possible employing any conventional blending means. Appropriate blending means, such as melt extrusion, batch melting and the like, are well known in the art and will not be described here in greater detail. See for example, "Extrusion" in the Encyclopedia of Polymer Science of Technology, Vo. 6, p. 571–631; John Wiley & Sons, 1986, incorporated herein by reference. Usefully, the blending procedure may be carried out at elevated temperatures above the melting point of the polymers added either alone or as a combination in a suitable form as for example, granules, pellets and powders, added to the melt with intensive mixings in a batch or a continuous mixer. For example, the aliphatic polyamide may be masterbatched or preblended with the oligomeric aromatic polyamide in the melt and this premix or masterbatch added to the aliphatic polyamide in the melt in amounts sufficient to provide the desired amount of aliphatic polyamide and oligomeric aromatic polyamide in the blend product. Similarly the blending procedure may be carried out at elevated temperatures, where one of the polymer components is melted and the other polymer component is admixed therewith by intimately mixing the components of the melt. Similarly, the various solid components may be granulated, and the granulated components mixed dry in a suitable blender, as for example, a Banbury or Henschel mixer, as uniformly as possible, then melt extruded in a single or twin screw extruder. The extruded blend is pelletized by cooling the strand and chopping off.

The blend according to the invention may be used for those applications for which polyamides and blends thereof may be used. They are thermoplastic materials from which fabricated articles of manufacture having valuable properties may be produced by conventional polymer shaping processes, such as injection molding and extruding. Examples of such moldings are components for lawn and garden equipment, power tool housings, snow shovel and snow-mobile housings, household equipment, sports equipment, electrical and electronics components, and automobile components. Examples of extruded products are films, melt-spun fiber and yarns, monofilaments, sheets, tubings, rods or profiles. Some of the semifinished products can be further shaped by machining or thermoforming.

Because of higher glass transition temperatures and enhanced retention of flexural modulus and flexural strength at ambient relative humidity (about 50% to about 65%), the compositions of this invention are especially useful for powertool housing and components, automotive exterior and interior parts, and some electrical parts.

The following examples are presented to better illustrate the invention and should not be construed as limiting the invention.

EXAMPLE 1

Into a 2 L glass kettle equipped with a heating mantle, thermometer, steam-jacketed condenser, addition funnel and an efficient stirrer, was charged 350 mL of molten caprolactam followed by sodium methoxide (0.16 g, 2.9 mmol) and isophthalic acid (185 g, 1.14 moles). The mixture was then heated with stirring to 200° C. Then 194 g (1.114 moles) of 2,4-tolylene diisocyanate (TDI) were added to the reactor contents via the addition funnel dropwise with stirring. As the reaction occurred, evolution of carbon dioxide was noticed with the gradual thickening of the contents. After the addition of TDI was complete (ca. 1 hr), the reaction mixture was heated for an additional two hours at 200° C. with stirring. The clear viscous solution of the poly(tolylene-2,4-diisophthalamide) in caprolactam was then added to a large excess (6L) of hot water (90° C.) with vigorous stirring to precipitate poly(tolylene-2,4-diisophthalamide) the product as a beige white solid. It was then filtered, washed with more hot water, and finally dried under vacuum (1 mm Hg) at 80° C. (Yield=325 g).

The poly(tolylene-2,4-diisophthalamide) obtained as above exhibited a Tg of ca. 224° C. by DSC. It had a reduced viscosity of 0.14 dl/g in N,N'-dimethyl acetamide (DMAc). Gel Permeation Chromatography (GPC) in N-methyl pyrrolidone indicated a molecular weight (Mn) of 3,900 using poly(methyl methacrylate) standards. Hydrolysis (aq. HCl)-GC analysis indicated the oligomer to be predominantly composed of 2,4-tolylene diamine and isophthalic acid units linked as polyamide with some caprolactam possibly bound as end groups.

In another variation of this procedure, instead of precipitating into water, the final reaction mixture was distilled under vacuum to remove part of the residual caprolactam. The poly(tolylene isophthalamide) could then be isolated as a concentrate (>70% solids) by cooling and grinding the solid. This oligomer concentrate can be used to blend with virgin, unwashed nylon 6 and then washed with hot water as usual to remove the residual caprolactam.

EXAMPLE 2

Into a glass-lined Pfaudler reactor (40 L) was charged 10.7 kg. of flaked caprolactam under a nitrogen blanket. The reactor was gradually heated to 120° C. and then 4.68 g of sodium methoxide and 5.5 kg of isophthalic acid were charged into the molten caprolactam. The contents were heated with stirring until a temperature of 200° C. was reached. At this point, 5.82 kg of technical grade tolylene diisocyanate (mixture of 2,4-tolylene diisocyanate and 2,6-tolylene diisocyanate) was added gradually into the reactor from a 8 L stainless steel charger, at a steady rate of ca.48 g/min. to maintain a controlled evolution of carbon dioxide (ca./30 ml/min).

After the addition of tolylene diisocyanate (mixture of 2,4-tolylene diisocyanate and 2,6-tolylene diisocyanate) was complete, the reaction mixture was stirred for another two hours and then precipitated into hot water (90° C., 3×60 L) with good agitation. The beige solid poly(tolyene-2,4-diisophthalamide co-tolyene-2,6-di-isophthalamide)(TDAI) was isolated by filtration and drying under vacuum at 80° C. (Yield=8.4 kg). The poly(tolylene 2,4-diisophthalamide co-tolylene-2,6-diisophthalamide)(TDAI)) had a reduced viscosity of 0.15 dl/g in DMAc and a Tg of 205° C. After methanol washing and drying, the oligomer exhibited a Tg of 220° C.

COMPARATIVE EXAMPLE A

Into a glass reactor similar to that in example 1, was charged 516 g of molten caprolactam, 0.2 g of sodium methoxide and 213 g of isophthalic acid. After the mixture was heated to 200° C., 321g of 4,4-methylene di(phenylisocyanate) was added slowly with stirring over a period of 1.5 hours. An additional 500 g of caprolactam was added at this stage to thin down the reaction mixture. After heating for an additional 2 hour period, the reaction mixture was precipitated into excess hot water (7 L). The oligomer poly(4,4'-methylene di(phenylisophthalamide) (MDAI) was filtered and dried as in Example 1. It exhibited a Tg of 257° C. and a reduced viscosity of 0.16 dl/g. (yield =467g).

EXAMPLE 3

A copolyamide oligomer was prepared by reacting a mixture of 2,4-tolylene diisocyanate(TDI) and 4,4'-methylene di(phenylisocyanate)(MDI) (1:1 mole ratio) with isophthalic acid in molten caprolactam using the procedure described in Example 1. The product had a Tg of 212° C. and a reduced viscosity of 0.17 dl/g.

EXAMPLE 4

A copolyamide oligomer was prepared by reacting a mixture of trimellitic anhydride and isophthalic acid (1:1 mole ratio) with an equivalent amount of 2,4-tolylene diisocyanate (TDI) using a procedure similar to that described in Example 1. It exhibited a Tg of 207° C.

EXAMPLE 5

Ground nylon 6 (90 Parts by weight) of (Capron$^R$ 8209), AlliedSignal Inc.; melt index=3.6@235 C & 2.16 Kg; Formic acid viscosity=135) was thoroughly mixed with 10 parts of (tolylene-2,6-isophthalamide)(TDAI), powder (from Ex. 1) and fed into the throat of a laboratory twin screw extruder (Haake -HBI TW-100, conical counter-rotating extruder, L=330 mm & L/D=20–30 mm). The blend was extruded at 280°–300° C. at a screw speed of 130–140 rpm. The homogeneous looking melt blend extrudate was quenched in water, pelletized and dried. DSC indicated an apparent single Tg of ca. 76° C., representing >20° C. increase relative to the Nylon 6 control (Tg=49–55C), while the melting point was nearly the same (ca.220° C.). After moisture equilibration at 50% relative humidity (RH), the blend exhibited an apparent Tg of 50.6° C. as measured by the tan $\delta_{max}$ peak in the dynamic mechanical spectrum (DMA,Seiko DMS 110) whereas the nylon 6 control similarly moisture conditioned exhibited a Tg (tan $\delta_{max}$) of 17° C. The DMA analysis was done on injection molded bars (20 mm×7 mm×1.7 mm) equilibrated at 50% relative humidity (RH) in a controlled humidity chamber.

EXAMPLE 6

A 15% blend of the TDAI oligomer (from Example 1) and Nylon 6 was prepared as described in Example 5 above. The blend had a Tg of 84° C. by DSC representing 29° C. increase in Tg relative to that of Nylon 6 control.

EXAMPLE 7

The Nylon 6/TDAI (90/10) blend of Example 5 was re-extruded with 33% chopped glass fiber on a Killion single screw extruder (25 mm) at 280° C., to prepare a glass reinforced nylon blend.

COMPARATIVE EXAMPLE B

MDAI oligomer (15 wt %) from Comparative Example A was melt blended with nylon 6 on the HBI TW-100 (Haake) twin screw extruder under the conditions similar to those used in Example 5. The blend extrudate exhibited a Tg of ca. 43° C. by DSC, which is apparently less than that of the Nylon 6 control (49°–55° C.).

COMPARATIVE MOISTURE CONDITIONING EXPERIMENTS—METHOD A (thin bars)

A series of experiments were carried out to show the extent to which the composition of this invention retains tensile modulus (ASTM D638) and tensile yield strength (ASTM D638) at 50% relative humidity. The compositions of this invention selected for evaluation were those of Examples 5, 6, and 7. For comparison purposes, unfilled nylon 6 and filled nylon 6, and the composition of Comparative Example B were also evaluated. In these experiments, pellets were injection molded on an injection molding machine Van Dorn, 125 ton to produce type V tensile bars (0.8 mm thickness). The samples were then tested for mechanical properties in both dry as-molded form (DAM) and after moisture conditioning at 50% RH to equilibrium moisture levels (ca.3%).

The results of the evaluation are set forth in the following Table 1.

TABLE 1

Properties of Nylon 6/aromatic polyamide oligomer blends

| Composition (%) | Control I | Control II | Ex. 5 | Ex. 6 | Ex. 7 | Comp. Ex. B |
|---|---|---|---|---|---|---|
| Nylon 6 (FAV = 135) | 100 | — | 90 | 85 | 60.3 | 85 |
| Nylon 6 (FAV = 45) | — | 67 | — | — | — | — |
| TDAI (from Ex. 1) | — | — | 10 | 15 | 6.7 | — |
| MDAI (from Ex. 3) | — | — | — | — | — | 15 |
| Glass fiber | — | 33 | — | — | 33 | — |
| Tg (C), dry (DSC) | 55 (49) | — | 76 | 84 | — | 43 |
| Tm (C) (DSC) | 223 | — | 221 | 221 | — | 220 |
| Tg (C) @ 50% RH (DMA, tan §max) | 17 | — | 50.6 | — | — | — |
| Tensile Modulus (Kpsi) | | | | | | |
| D.A.M. | 287 | 1035 | 305 | 288 | 1028 | — |
| 50% RH eqbm | 103 | 667 | 193 | 258 | 780 | — |
| Yield strength (Kpsi) | | | | | | |
| D.A.M. | 11.5 | 25.9 | 12.7 | 13.2 | 28.8 | — |
| 50% RH, eqbm. | 4.9 | 15.5 | 6.1 | 8.2 | 18.5 | — |

EXAMPLE 8

Nylon 6 powder (Formic acid viscosity=45) mixed with 15 wt % of TDAI powder ( from Example 2) was fed into throat of the twin screw extruder corotating twin-screw extruder (Leistritz, 28 mm, L/D=40;10 sections/zones) and extruded at 260° C. (all zones) while maintaining a screw speed of 200 rpm and a throughput rate of ca. 12 kg/hr. Vacuum was applied at zone 9. The blend extrudate was quenched in water, pelletized and dried as usual. The blend exhibited a Tg of 64.5° C. after quenching in a DSC while Nylon 6 control had a Tg of 49° C. The blend had a melt index of 25 g/10 min @235° C.

EXAMPLE 9

A dry blend of 65 parts of Nylon 6 (Formic acid viscosity=55) 15 parts of TDAI oligomer (from Example 2), and 20 parts of a maleated polypropylene was fed at the throat of the Leistritz twin-screw extruder and extruded as decribed above at 260° C. The melt blended extrudate was pelletized and dried as usual. It exhibited a DSC Tg of 70° C. (for the Nylon phase) and a melt index of 4.3 g/10 min @235° C.

The maleated polypropylene used above was prepared in a separate step by extruding 100 parts of polypropylene (Profax 6823, Himont, U.S.A., with an MI=0.4 at 230° C./2.16 kg) (M.I.) of 0.4) together with 1 part of maleic anhydride and 0.25 parts of an organic peroxide (Luperco 130XL, Lucidol) in the same Leistritz twin screw extruder at a barrel temperature (all zones) of 190° C., melt temperature of 205° C., a screw speed of 80 rpm and a throughput rate of 9 kg/hr.

EXAMPLE 10

A dry blend of 70 parts of Nylon 6 (Formic acid viscosity=45), 15 parts of TDAI oligomer (from Ex.2) and 15 parts of a maleated LDPE was extruded on the Leistritz twin screw extruder at 260° C. as in Ex.9. It had a melt index of 8 g/10 min@235° C. The maleated LDPE was prepared in a separate step by extruding 100 parts of LDPE (Dow 640,M.I. of 2) with 1 part of maleic anhydride and 0.3 parts of an organic peroxide (Luperco 130XL) on a Werner Pfleiderer WP-40 twin screw extruder with zones 1–6@190C, zones 7–10@200° C. The screw speed was 163 rpm and the throughput was 45 kg/hr.

EXAMPLE 11

A dry blend of Nylon 6 (FAV=45) and TDAI (from Example 2) at 85/15 ratio was fed at throat of the Leistritz extruder while glass fiber was added at zone 4. The barrel temperature was 280° C. for zones 1–4 and 260° C. for zones 5–10. Vacuum was applied at zone 9. The screw speed was 200 rpm and the output rate was 14 kg/hr. The M.I. of the blend was 60 g/10 min @235° C.

EXAMPLE 12

A dry blend of 45.5 parts of Nylon 6 (FAV=45) and 10.5 parts of TDAI (from Ex.2)was fed into the throat of the Leistritz twin-screw extruder, while 30 parts of chopped glass fiber and 14 parts of maleated polypropylene were added at zone 4 and zone 6, respectively. The extrusion conditions were similar to those of Ex. 11. The M.I. of the blend was 46 g/10 min @235° C.

EXAMPLE 13

A dry blend of 49 parts of Nylon 6 (FAV=45) and 10.5 parts of TDAI (from Example 2)was fed at the throat of the Leistritz extruder, while 30 parts of chopped glass fiber and 10.5 parts of maleated LDPE were added at zone 4 and zone 6 respectively. The extrusion conditions were similar to those employed in Ex. 12. The M.I. of the blend was 39 g/10 min @235° C.

COMPARATIVE EXAMPLE C

A nylon 6/polypropylene (60/40) blend without the aromatic polyamide oligomer was prepared for comparison purposes, using the procedure of Example 9, except that 60 parts of nylon 6 (FAV=58) and 40 parts of maleated polypropylene were used in the melt blending process.

COMPARATIVE EXAMPLE D

A 30% glass reinforced composition of nylon 6/polypropylene blend (60/40) without the aromatic polyamide oligomer was prepared for comparison purposes,using the procedure similar to Example 13, for melt blending 42 parts of nylon 6 (FAV=58), 28 parts of maleated polypropylene (from example 9) and 30 parts of chopped glass fiber.

COMPARATIVE MOISTURE CONDITIONING EXPERIMENTS—METHOD (thick bars)

A series of experiments were carried out to show the extent to which the compositions of this invention retain the flexural modulus (ASTM D790) and flexural strength (ASTM D790) at 50% relative humidity. The composition of this invention selected for evaluation were those of Examples 8 to 13. For comparison purpose, unfilled nylon 6 (Control A), glass filled nylon 6 (Control B), and the compositions of Comparative Examples C & D were also evaluated. In these experiments, the pellets were injection molded on an injection molding machine (Van Dorn, 125 ton) to produce type II tensile bars (3 mm thickness). The mechanical properties of all these blends were tested both dry as molded and after equilibrating at 50% RH via an accelerated conditioning procedure using potassium acetate solution as described in the reference: "Nylon Plastics" M. I. Kohan (Ed), John Wiley & Sons (1971), p.560.

The mechanical properties of nylon 6/TDAI and nylon 6/TDAI/polyolefin blends (unfilled and 30% glass filled) are set forth in the following Table 2 The * indicates accelerated conditioning procedure: 3 mm thick" bars were refluxed in 56% KOAc aqueous solution for 45 hours, cooled for 2 days, and then tested.

DIMENSIONAL GROWTH COMPARISON EXPERIMENTS

A series of experiments were carried out to show the extent to which the compositions of this invention exhibit reduced tendency for moisture induced dimensional growth, which equilibrated to high relative humidity such as 56% RH. Rectangular plaques (of 150 mm length, 100 mm width and 1.6 mm thickness) were molded from the compositions of this invention (Examples 8–13) as well as from unfilled nylon 6 (Controls A & B), and Comparative Examples C & D. An injection molder (Van Dorn, 125 ton) was used to fabricate these plaques. The plaques were annealed at 120° C. for 2 days to relieve any molded-in-stress. They were then equilibrated in a controlled humidity chamber (@56% RH) for 100 days. The average increase in the length and width was measured and expressed as the dimensional growth (%) in Table 2.

TABLE 2

| | UNFILLED | | | | |
|---|---|---|---|---|---|
| Composition | Control A | Ex. 8 | Ex. 9 | Ex. 10 | Comp. C |
| Nylon 6 (FAV = 58) | — | — | 65 | 70 | 60 |
| Nylon 6 (FAV = 45) | 100 | 85 | — | — | — |
| TDAl oligomer (from Ex. 2) | — | 15 | 15 | 15 | — |
| Glass Fiber | — | — | — | — | — |
| m-LDPE | — | — | — | 15 | — |
| m-PP | — | — | 20 | — | 40 |
| Water absorption @ 50% RH*, % | 2.6 | 2.3 | 1.8 | 1.9 | 1.5 |
| Tensile strength (dam), psi | 11,200 | 13,600 | 11,400 | 10,300 | — |
| Tensile strength (50% RH*), psi | 4,800 | 9,600 | 8,900 | 8,200 | — |
| Tensile strength retention | 43% | 71% | 78% | 80% | — |
| Tensile modulus (dam), psi | 341,000 | 427,000 | 397,000 | 361,000 | — |
| Tensile modulus (50% RH*), % | 112,000 | 367,000 | 332,000 | 305,000 | — |
| Tensil modulus retention | 33% | 86% | 84% | 84% | — |
| Elongation-at-break. (dam), % | n/a | 25 | 20 | 17 | — |
| Elongation-at-break (50% RH*), % | n/a | 31 | 29 | 39 | — |
| Flex strength (dam), psi | 15700 | 16,700 | 14,300 | 12,800 | 10,900 |
| Flex strength (50% RH*), psi | 4,700 | 12,800 | 11,700 | 10,900 | 5,000 |
| Flex strength retention, % | 33% | 77% | 82% | 85% | 46% |
| Flex modulus (dam), psi | 410,000 | 413,000 | 374,000 | 323,000 | 290,600 |
| Flex modulus (50% RH*), psi | 124,000 | 372,000 | 348,000 | 319,000 | 160,000 |
| Flex modulus retention | 26% | 90% | 93% | 99% | 55% |
| Dimensional growth at 56% RH (%) | 1.0 | 0.75 | 0.58 | 0.59 | — |

| | 30% GF FILLED | | | | |
|---|---|---|---|---|---|
| Composition | Control B | Ex. 11 | Ex. 12 | Ex. 13 | Comp. D |
| Nylon 6 (FAV = 58) | — | — | — | — | 42 |
| Nylon 6 (FAV = 45) | 70 | 59.5 | 45.5 | 49 | — |
| TDAl oligomer (from Ex. 2) | — | 10.5 | 10.5 | 10.5 | — |
| Glass Fiber | 30 | 30 | 30 | 30 | 30 |
| m-LDPE | — | — | — | 10.5 | — |
| m-PP | — | — | 14 | — | 28 |
| Water absorption @ 50% RH*, % | 1.8 | 1.7 | 1.2 | 1.3 | 1 |
| Tensile strength (dam), psi | 24,300 | 25,600 | 22,400 | 20,300 | 17,000 |
| Tensile strength (50% RH*), psi | 16,100 | 22,100 | 21,100 | 19,300 | 14,200 |
| Tensile strength retention | 66% | 86% | 94% | 95% | 83% |
| Tensile modulus (dam), psi | 1,301,000 | 1,400,000 | 1,340,000 | 1,260,000 | 1,050,000 |
| Tensile modulus (50% RH*), % | 737,000 | 1,240,000 | 1,270,000 | 1,160,000 | 704,000 |
| Tensil modulus retention | 57% | 89% | 95% | 92% | 70% |
| Elongation-at-break. (dam), % | 4.1 | 3.2 | 3.4 | 3.1 | 3.7 |
| Elongation-at-break (50% RH*), % | 8.5 | 3.8 | 3.4 | 3.3 | 4.8 |
| Flex strength (dam), psi | 36,000 | 36,000 | 32,000 | 30,000 | 27,500 |
| Flex strength (50% RH*), psi | 21,800 | 32,600 | 29,200 | 27,100 | 18,800 |
| Flex strength retention, % | 61% | 91% | 91% | 90% | 69% |
| Flex modulus (dam), psi | 1,230,000 | 1,310,000 | 1,180,000 | 1,160,000 | 920,000 |
| Flex modulus (50% RH*), psi | 696,000 | 1,240,000 | 1,170,000 | 1,130,000 | 650,000 |
| Flex modulus retention | 57% | 95% | 99% | 97% | 71% |
| Dimensional growth (%) @ 56% RH | 0.41 | 0.39 | 0.30 | 0.34 | — |

EXAMPLE 14

A dry blend of 63 parts of nylon (FAV=45), 7 parts of TDAI (from Example 2), 30 parts of glass fiber. and 0.32 parts of talc(as nucleator)were extruded together under the conditions used similar to Example 11, in which the glass fiber was added at zone 4 of the twin-screw extruder.

EXAMPLE 15

A dry blend of nylon 6 powder (50.4 parts) and TDAI (from Example 2, 8.9 parts) and a maleated styrene-ethylene/butylene-styrene block copolymer rubber (Kraton®FG1901 x, Shell Chem. Co.)(7.7 parts) were extruded together as in Example 11 while 33 parts of glass fiber were added at zone 4.

The blends from Examples 16 and 17 were injection molded and tested as described in Comparative Moisture Conditioning Experiments—Method B. The results are shown in Table 3.

EXAMPLE 16

A dry blend of 59.5 parts of nylon 6,6 pellets (Zytel® 101, E. I. DuPont Co.), 10.5 parts of TDAI (from Example 2), and 0.12 parts of talc were extruded together under conditions similar to those used in Example 11 except that 30 parts of chopped glass fiber was added at Zone 4 of the twin-screw extruder and the barrel temperature was maintained at 280°–290° C. The extrudate was pelletized and dried as usual. The pellets were then injection molded into type II tensile bars (3 mm thickness) on an injection molding machine (VanDorn, 125 ton) at a barrel temperature of about 300° C. and a mold temperature of about 80° C. The glass transition temperature of the blend sample was found to be 80° C. representing a 24° C. increase in Tg relative to nylon 6,6 control.

TABLE 3

PROPERTY RETENTIONS OF GLASS FILLED NYLON 6/TDA1 BLENDS

|  | Example 14 | Example 15 |
|---|---|---|
| Nylon 6 (FAV = 45) | 63 | 50.4 |
| TDA1 | 7 | 8.9 |
| Glass fiber | 30 | 33 |
| Maleated S-EB-S | 0 | 7.7 |
| talc | 0.32% | none |
| Ratio of TDA1/Nylon 6 | 10/90.0 | 15/85 |
| Water Pickup, % | 1.8 | 1.3 |
| Tensile strength (dam), psi | 25,800 | 22,500 |
| Tensile strength (50% RH), psi | 18,100 | 18,300 |
| Tensile strength retention, % | 70.1 | 81.3 |
| Tensile modulus (dam), psi | 1,350,00 | 1,360,000 |
| Tensile modulus (50% RH), psi | 1,080,000 | 1,260,000 |
| Tensile modulus retention, % | 80 | 92.6 |
| Elongation-at-break (dam), psi | 4 | 3.6 |
| Elongation-at-break (50% RH), % | 3.4 | 4.5 |
| Flex strength (dam), psi | 36,800 | 32,600 |
| Flex strength (50% RH), psi | 26,900 | 27,600 |
| Flex strength retention, % | 73.1 | 84.7 |
| Flex modulus (dam), psi | 1,290,000 | 1,220,000 |
| Flex modulus (50% RH), psi | 940,000 | 1,050,000 |
| Flex modulus retention, % | 72.9 | 86.1 |
| Notched Izod (dam), ft-lb/in | 1.6 | 2.8 |

What we claim is:

1. A polyamide composition comprising a blend of:
   (a) at least one aliphatic polyamide; and
   (b) at least one oligomeric wholly aromatic polyamide having recurring monomeric units of the formulas Formula A:

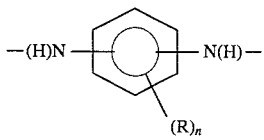

and Formula B: —CO—Ar—CO
wherein:

n is 0, 1, 2, 3, or 4;

R is the same or different at each occurrence and is alkyl, alkoxy, halo, aryl, aryloxy; and Ar is an arylene moiety which is selected from the group consisting of 1,3-(or 1,4-) phenylene; and 2,6-naphthylene wherein said oligomeric aromatic polyamide (b) has an intrinsic viscosity of less than about 0.7 dl/g as measured in 0.5 percent N,N'-dimethylacetamide at about 25° C.

2. The polyamide composition of claim 1 wherein said aliphatic polyamide is present in an amount of at least about 70 weight percent based on the total amount of said polyamide composition.

3. The polyamide composition of claim 1 wherein said oligomeric aromatic polyamide is present in an amount of at least about 1 weight percent based on the total amount of said polyamide composition.

4. The polyamide composition of claim 1 wherein said oligomeric aromatic polyamide is selected from the group consisting of poly(tolylene-2,4-(2,6)-isophthalamide); poly(tolylene-2,6-isophthalamide); poly(tolylene-2,4(2,6)-tere/isophthalamide); poly(methylene-bis-4,4'-diphenylene/tolylene-2,4(2,6)-isophthalamide); and mixtures thereof.

5. The polyamide composition of claim 1 wherein said oligomeric aromatic polyamide is selected from the group consisting of poly(tolylene-2,4-(2,6)isophthalamide); poly(tolylene-2,6-isophthalamide); poly(methylene-bis-4,4'-diphenylene/tolylene-2,4(2,6)-isophthalamide); and mixtures thereof.

6. The polyamide composition of claim 1 wherein said oligomeric aromatic polyamide is selected from the group consisting of poly(tolylene-2,4(2,6)-isophthalamide); poly(tolylene-2,6-isophthalamide); and mixtures thereof.

7. The polyamide composition of claim 1 wherein said aliphatic polyamide is selected from the group consisting of poly(tetramethylene adipamide)(nylon 4,6); poly(hexamethylene adipamide) (nylon 6,6); poly(hexamethylene azelamide)(nylon 6,9); poly(hexamethylene sebacamide) (nylon 6,10); poly(heptamethylene pimelamide) (nylon 7,7); poly(octamethylene suberamide) (nylon 8,8); poly(nonamethylene azelamide) (nylon 9,9); poly(decamethylene azelamide) (nylon 10,9); poly(4-aminobutyric acid) (nylon 4); poly(6-aminohexanoic acid) (nylon 6); poly(7-aminoheptanoic acid) (nylon 7); poly(8-aminoocatanoic acid) (nylon 8); poly(9-aminononanoic acid) (nylon 9); poly(10-aminodecanoic acid) (nylon 10); poly(11-amino-undecanoic acid) (nylon 11); poly( 12-aminododecanoic acid) (nylon 12); caprolactam/hexamethylene adipamide copolymer (nylon 6/6,6); hexamethylene adipamide/caprolactam copolymer (nylon 6,6/6); hexamethylene adipamide/hexamethyleneazelamide copolymer (nylon 6,6/6,9); copolymers formed from recurring units of the above referenced aliphatic polyamides with aliphatic/aromatic polyamide recurring units; and mixtures thereof.

8. The polyamide composition of claim 1 wherein said aliphatic polyamide is selected from the group consisting of poly(caprolactam); poly(7-aminoheptanoic acid); poly(tetramethylene adipamide); poly(hexamethylene adipamide); and mixtures thereof.

9. The polyamide composition of claim 1 wherein said aliphatic polyamide is selected from the group consisting of poly(caprolactam); poly(hexamethylene adipamide); poly(tetramethylene adipamide); and mixtures thereof.

10. The polyamide composition of claim 6 wherein said aliphatic polyamide is selected from the group consisting of poly(caprolactam); poly(hexamethylene adipamide); poly(tetramethylene adipamide); and mixtures thereof.

11. An article of manufacture comprising a body formed totally or in part from the composition of claim 1.

12. The polyamide composition of claim 1 wherein said oligomeric aromatic polyamide (b) has an intrinsic viscosity from about 0.1 to 0.7 dl/g.

13. The polyamide composition of claim 1 wherein said oligomeric aromatic polyamide (b) has an intrinsic viscosity from about 0.15 to about 0.5 dl/g.

14. The polyamide composition of claim 1 wherein said oligomeric aromatic polyamide (b) has an intrinsic viscosity from about 0.14 to about 0.17 dl/g.

* * * * *